(12) United States Patent
Lee et al.

(10) Patent No.: US 8,349,482 B2
(45) Date of Patent: Jan. 8, 2013

(54) ELECTRODE ASSEMBLY AND SECONDARY BATTERY WITH THE SAME

(75) Inventors: Sangok Lee, Yongin-si (KR); Myungro Lee, Yongin-si (KR); Cheolhee Hwang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 948 days.

(21) Appl. No.: 11/924,869

(22) Filed: Oct. 26, 2007

(65) Prior Publication Data
US 2008/0102361 A1    May 1, 2008

(30) Foreign Application Priority Data

Oct. 27, 2006  (KR) .................. 10-2006-0105084

(51) Int. Cl.
H01M 2/18  (2006.01)
H01M 2/16  (2006.01)
H01M 2/14  (2006.01)

(52) U.S. Cl. .................. 429/142; 429/129; 429/137
(58) Field of Classification Search .................. 429/129, 429/137, 142
See application file for complete search history.

(56) References Cited

U.S. PATENT DOCUMENTS

| | | | |
|---|---|---|---|
| 4,285,751 A | | 8/1981 | Feinberg et al. |
| 5,869,208 A | * | 2/1999 | Miyasaka ..................... 429/224 |
| 6,627,346 B1 | | 9/2003 | Kinouchi et al. |
| 2004/0053122 A1 | * | 3/2004 | Sugiyama et al. ............ 429/144 |
| 2005/0118097 A1 | | 6/2005 | Sakon et al. |
| 2005/0164090 A1 | | 7/2005 | Kim et al. |
| 2005/0221192 A1 | * | 10/2005 | Hennige et al. ............... 429/246 |
| 2006/0127753 A1 | * | 6/2006 | Nakashima et al. .......... 429/142 |
| 2007/0042270 A1 | * | 2/2007 | Ohata et al. ................... 429/246 |
| 2008/0248381 A1 | | 10/2008 | Hennige et al. |

FOREIGN PATENT DOCUMENTS

| | | |
|---|---|---|
| EP | 0 983 980 A1 | 3/2000 |
| JP | 2660383 | 10/1997 |
| JP | 11-40138 | 2/1999 |
| JP | 11-236279 | 8/1999 |
| JP | 2001-135295 | 5/2001 |
| JP | 2002-025531 | 1/2002 |
| JP | 2002-25531 | 1/2002 |
| JP | 2005-154227 | 6/2005 |
| KR | 2005-77079 | 8/2005 |

(Continued)

OTHER PUBLICATIONS

Albermarle, Martoxid MZS-1, http://www.martinswerk.de/PDF/Martoxid_MZS_1.pdf, 2007.*

(Continued)

*Primary Examiner* — Eugenia Wang
(74) *Attorney, Agent, or Firm* — Christie, Parker & Hale, LLP

(57) ABSTRACT

The present invention relates to an electrode assembly and a secondary battery with the same, more particularly to the electrode assembly which includes an anode plate, a cathode plate, and a separator disposed between the anode plate and the cathode plate, wherein the separator includes a ceramic separator including a ceramic filler which is formed by mixing two groups of particles of the same material, but with a different diameter. The particles with the comparatively smaller diameter are disposed between the particles with the comparatively greater diameter.

14 Claims, 3 Drawing Sheets

FOREIGN PATENT DOCUMENTS

| | | |
|---|---|---|
| KR | 2006-87178 | 8/2006 |
| KR | 2007-19952 | 2/2007 |
| WO | WO 2005/078828 A1 * | 8/2005 |

OTHER PUBLICATIONS

Albermarle, Martroxid MZS-3, http://www.martinswerk.de/PDF/Martoxid_MZS_3.pdf, 2007.*

Patent Abstracts of Japan for Japanese Publication 07-025684 corresponding to Japanese Patent 2660383 listed above.

English Machine Translation of JP 2660383, 5 pages, listed above.

English Machine Translation of JP 11-236279, 10 pages, listed above.

English Machine Translation of JP 2005-154227, 17 pages, listed above.

Patent Abstracts of Japan, and English machine translation of Japanese Publication 11-040138, previously submitted in an IDS dated Nov. 30, 2007, 17 pages.

Patent Abstracts of Japan, and English machine translation of Japanese Publication 2001-135295, previously submitted in an IDS dated Nov. 30, 2007, 10 pages.

* cited by examiner

ELECTRODE ASSEMBLY AND SECONDARY BATTERY WITH THE SAME

CROSS-REFERENCE TO RELATED APPLICATION

This application claims the benefit of Korean Application No. 2006-105084, filed Oct. 27, 2006, in the Korean Intellectual Property Office, the disclosure of which is incorporated herein by reference.

BACKGROUND OF THE INVENTION

1. Field of the Invention

Aspects of the present invention relate to an electrode assembly and a secondary disposing a ceramic separator between a positive electrode plate and a negative electrode plate, and a secondary battery with the same.

2. Description of the Related Art

As opposed to a primary battery, a secondary battery is rechargeable, and thus, is reusable. Secondary batteries are generally used as the main power source of portable devices for communication, information processing, and audio/video applications. Currently, interest in secondary batteries is increasing and improved secondary batteries are rapidly being developed. For example, secondary batteries that are super-light, have a high energy density, are environment-friendly, have a high output voltage, have a low electric discharge rate, and have a longer lifespan, are being developed.

Secondary batteries are classified into Ni-MH batteries, Li-ion batteries, and the like, based on electrode active materials. Li-ion batteries may be classified based on the type of electrolyte, for example, a liquid electrolyte, a solid electrolyte, or a gel-type electrolyte. Secondary batteries are classified into various types, such as, a can type, a pouch type, and the like, based on the shape of a can within which the electrode assembly is accommodated.

The weight-to-energy density of a Li-ion battery is much greater than that of a primary battery, and thus, can be manufactured as a super-light battery. The average voltage of each cell of a Li-ion battery is about 3.6V, and each cell is three times more compact, in comparison with the average voltage of about 1.2V, of other secondary batteries, such as Ni—Cd batteries and Ni-MH batteries. Lithium ion batteries have an electric discharge rate of less than 5% a month, at a temperature of about 20° C., which is about one third of the electric discharge rate of a Ni—Cd battery or a Ni-MH battery. A lithium ion battery does not use heavy metals, such as, cadmium (Cd), or mercury (Hg), and thus, is environment-friendly. A lithium ion battery can be recharged more than one thousand times in a normal state. Accordingly, research into secondary batteries is being rapidly performed, based on the above-described advantages.

A conventional second battery forms a bare cell by disposing an electrode assembly, which is formed of a positive electrode plate, a negative electrode plate, and a separator, within a can formed of either aluminum or aluminum alloy. An opening formed in the can is sealed with a cap assembly. Electrolyte is injected into the can, via the opening. When the can is formed of either aluminum or an aluminum alloy, the battery can be light, due to the lightness of aluminum. When the battery is used for a long time under a high voltage, the battery does not rust.

The sealed bare cell is connected to safety devices, such as, a positive temperature coefficient device (PTC), a thermal fuse, a protective circuit module (PCM), and/or other battery accessories. In this state, the bare cell is contained within a separate hard package, or is contained within a molding formed using a hot melt resin.

The separator of the electrode assembly is disposed between the positive electrode and the negative electrode, in order to prevent a short-circuit therebetween. However, when the separator does not have a sufficient permeability and/or wettability with respect to the electrolyte, the separator restricts the movement of lithium ions between the positive electrode and the negative electrode, and thereby results in degraded electrical properties.

The separator prevents overheating of the secondary battery, by acting as a safety device. However, when the temperature of the battery suddenly increases due to, for example, thermal transmission from outside, and the like, the temperature of the secondary battery may increase, even though minute through-holes of the separator are closed. Consequently, the separator may be damaged.

A second battery generally has a high capacity. Accordingly, when large amount of current flows in the secondary battery in a comparatively short time, the temperature of the secondary battery is not decreased by stopping the current flow, even though the minute holes of the separator are closed. On the contrary, due to the generated heat, the separator may become fused. Consequently, an internal short-circuit may occur, due to damage to the separator.

There is a need to prevent the internal short-circuit between electrodes, even at a high temperature. Accordingly, the separator is a ceramic separator with a porous film. In this instance, the ceramic separator is formed by combining particles of a ceramic filler with a heat-resistant binder.

In the conventional art, the ceramic separator generally uses alumina ($Al_2O_3$) particles having the same average particle size to form the ceramic filler. Since the alumina ($Al_2O_3$) particles have the same particle diameter, a pore compaction between the particles is reduced, and an insulating property of the ceramic separator is also reduced, as the thickness thereof increases.

SUMMARY OF THE INVENTION

An aspect of the present invention provides an electrode assembly, in which the compaction of a separator film is improved, and thus, an insulating property is also improved, and a secondary battery with the same.

According to an aspect of the present invention, there is provided an electrode assembly including an positive electrode plate, a negative electrode plate, and a separator being disposed between the positive electrode plate and the negative electrode plate. The separator is a ceramic separator including a ceramic filler. The ceramic filler is formed by mixing first and second groups of ceramic particles, with the first group having a smaller average particle diameter than the second group.

According to an aspect of the present invention, the ceramic filler may be formed by mixing the two groups of particles at a predetermined mixture ratio with a binder.

According to an aspect of the present invention, the ceramic filler can comprise 70% to 90%, by weight, of the smaller average diameter particles and 10% to 30%, by weight, of the larger average diameter particles, based on a total particle weight of the ceramic filler.

According to an aspect of the present invention, the ceramic particles are alumina ($Al_2O_3$) particles.

According to an aspect of the present invention, the first group comprises particles of alumina ($Al_2O_3$) having an average diameter of ranging from 0.4 μm to 0.7 μm and the second group comprises particles of alumina having an average diameter ranging of 0.1 µm to 0.3 µm.

According to an aspect of the present invention, an average pore size of the ceramic separator is within the range of 40 nm to 100 nm.

According to another aspect of the present invention, there is provided a secondary battery including an electrode assembly, a can, and a cap assembly. A separator is disposed between two plates of the electrode assembly. The electrode assembly is stacked and wound. The separator includes a ceramic separator. The ceramic separator includes a ceramic filler formed by mixing first and second groups of ceramic particles of the same material. The particles of the first group can have a smaller average diameter than the particles of the second group. The ceramic filler can comprise a mixture of 70% to 90%, by weight, of the first group, and 10% to 30%, by weight, of the second group. The second group can be particles of alumina ($Al_2O_3$) and can have an average particle diameter ranging from 0.4 µm to 0.7 µm. The first group may have an average particle diameter ranging from 0.1 µm to 0.3 µm.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
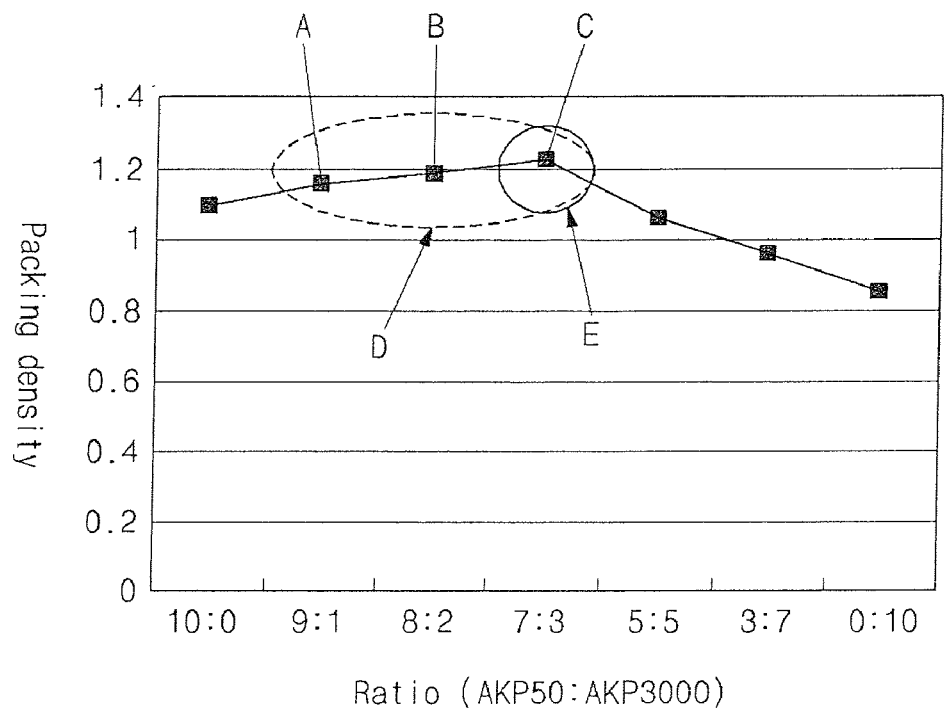
FIG. 1 is a graph illustrating a packing density of a ceramic filler, based on a mixture ratio of alumina ($Al_2O_3$) particles with an average particle diameter of 0.1 µm, and alumina ($Al_2O_3$) particles with an average particle diameter of 0.5 µm, according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention, by referring to the figures.

Figure 5:
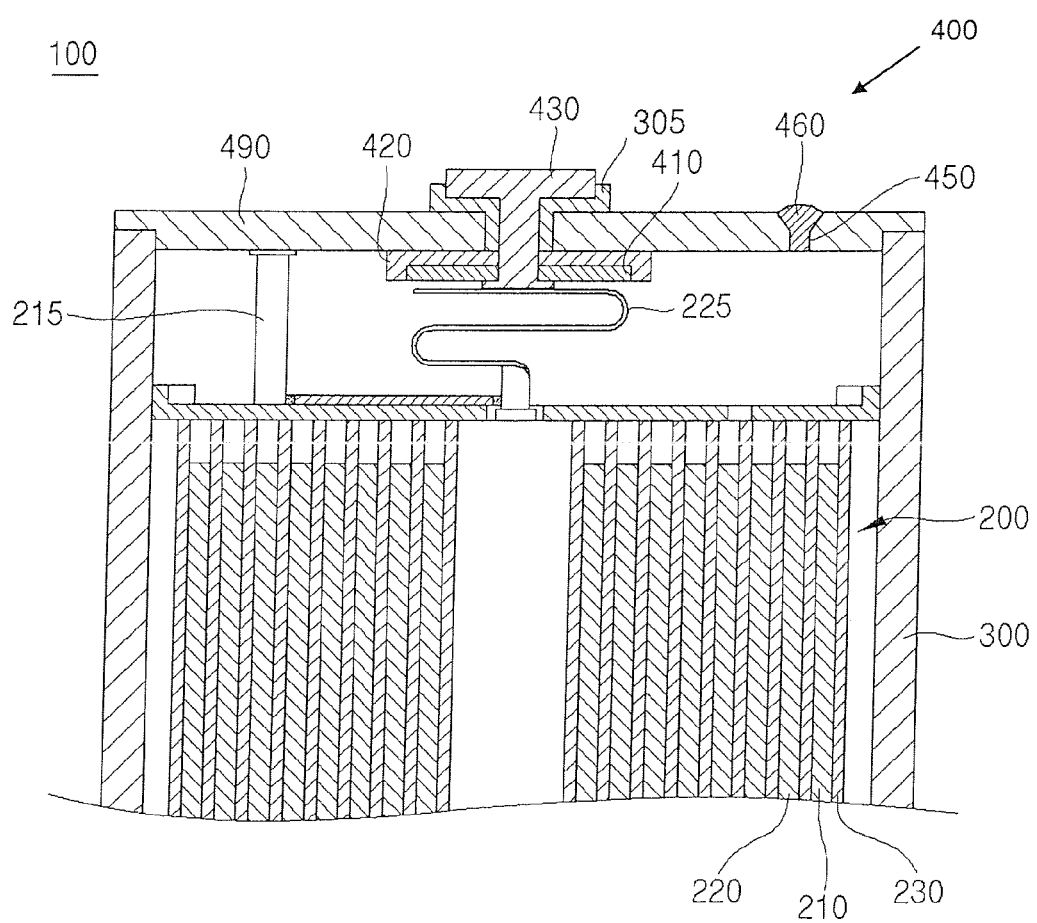
FIG. 5 depicts a secondary battery including an electrode assembly.

As shown in FIG. 5, a secondary battery 100, according to an exemplary embodiment of the present invention, includes an electrode assembly 200. The electrode assembly 200 includes an positive electrode (anode) plate 210, a negative electrode (cathode) plate 220, and a separator 230 disposed between the anode plate 210 and the cathode plate 220. The separator 230 is to insulate the anode plate 210 from the cathode plate 220. Lithium ions move through the separator 230, as they travel between the anode plate 210 and the cathode plate 220. The anode plate 210, the separator 230, and the cathode plate 220 are stacked and wound around one another.

The anode plate 210 includes a positive electrode collector (not shown), a positive electrode coating portion, and a positive electrode tap 215. The positive electrode collector is formed of thin aluminum foil. The positive electrode coating portion, which includes lithium-based oxide as a main component, is applied on both surfaces of the positive electrode collector. A positive electrode non-coating portion, at which no positive electrode coating portion is provided, is formed at both ends of the positive electrode collector, at predetermined intervals. A lithium oxide, such as, $LiCoO_2$, $LiMn_2O_4$, $LiNiO_2$, $LiMnO_2$, etc., is used for the positive electrode active material.

The positive electrode tap 215 is fixed to a positive electrode non-coating portion, which is attached to an inner circumferential portion, after winding, by ultrasonic welding or laser welding. The positive electrode tap 215 is formed of nickel, and fixed to the positive electrode non-coating portion, so that a top portion of the positive electrode tap 215 may protrude from a top portion of the positive electrode collector (not shown).

The cathode plate 220 includes a negative electrode collector (not shown), a negative electrode coating portion, and a negative electrode tap 225. The negative electrode collector is formed of thin aluminum foil. The negative electrode coating portion, which includes a carbon material as a main component, is applied on both surfaces of the negative electrode collector. A negative electrode non-coating portion, on which the negative electrode coating portion is not coated, is formed at both ends of the negative electrode collector. A carbon (C)-based material, Si, Sn, tin oxide, composite tin alloys, or a transition metal oxide, etc., is used for the negative electrode active material.

The negative electrode tap 225 is formed of nickel, and is fixed to a negative electrode non-coating portion, which is attached to in an inner circumferential portion of the electrode assembly 200, after winding, by ultrasonic welding for example. The negative electrode tap 225 is fixed to the negative electrode non-coating portion, so that a top portion of the negative electrode tap 225 may protrude from a top portion of the negative electrode collector 225.

The separator 230 includes at least one ceramic separator layer. The separator 230 can be the ceramic separator layer. The ceramic separator layer includes a ceramic filler which is formed by mixing two groups of particles. The two groups of particles are particles of the same material, but have different average particle diameters.

The ceramic separator 230 may be formed to surround one or both of the electrode plates 210 and 220. The ceramic separator 230 can be formed by mixing the ceramic filler, a binder, and a solvent, thereby forming a mixture. The ceramic particles of the mixture are mixed such that the particles have a uniform distribution. The electrode plates 210 and 220 can be dipped into the mixture and/or the mixture may be sprayed onto the cathode plate 220 and/or the anode plate 210.

The binder is generally formed of polymer resin. The polymer resin may be formed of polymers of acrylate and/or methacrylate, or copolymers thereof, which can withstand temperatures greater than, or equal to, 200° C. A relatively small amount of the binder may be used in the mixture, so as to form a porous film. Specifically, when the ratio of ceramic materials to the binder ranges from 98:2 to 85:15, based on the mass of the porous film, it is possible to prevent the binder from completely covering the ceramic material filler. That is, it is possible to prevent the binder from completely covering the filler material, and thereby restricting the transition of ions into the ceramic filler.

The ceramic filler is formed by mixing first and second groups of particles of the same material, according to a mixture ratio. The particles of the first group have a smaller average particle diameter than the particles of the second group. The ceramic filler can include from about 70% to 90%, by weight, of the first group and 10% to 30%, by weight, of the second group. For example, the ceramic filler can comprise 70%, by weight, of the first group and 30%, by weight, of the second group. Accordingly, the smaller particles of the first group are interspersed into the gaps between the larger particles of the second group, and thereby, the pore side of the ceramic filler is controlled.

As described above, the ceramic filler is formed by mixing the two groups of particles with different average diameters (particle sizes). The second group of particles may include alumina ($Al_2O_3$) particles having an average particle diameter ranging from 0.4 μm to 0.7 μm. The first group of particles may include alumina ($Al_2O_3$) particles having an average particle diameter ranging from 0.1 μm to 0.3 μm. While the particles are described as being particles of alumina, other suitable ceramic particles can be used.

Figure 2:
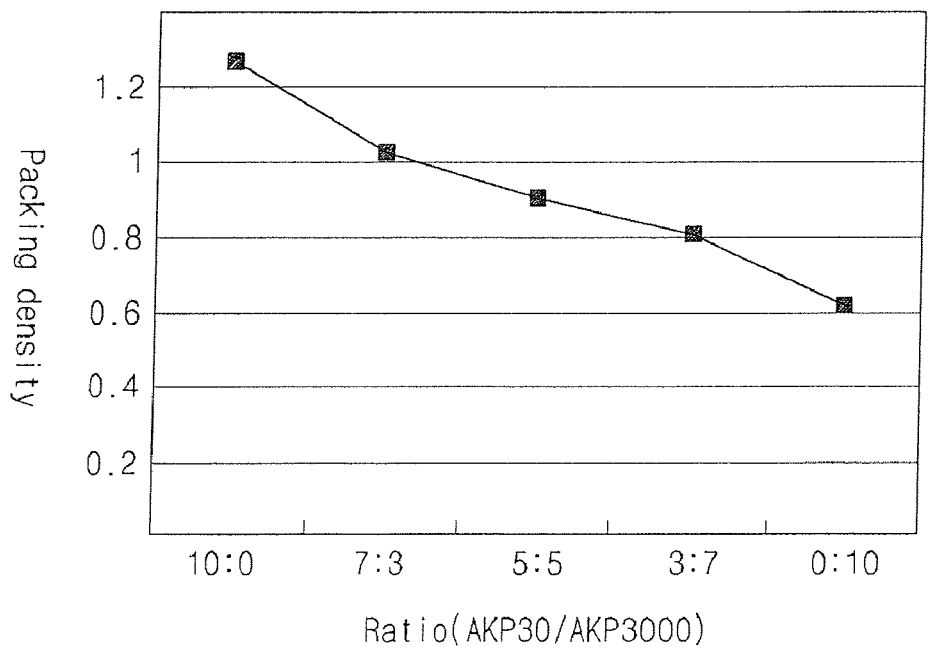
FIG. 2 is a graph illustrating a packing density of ceramic filler, based on a mixture ratio of alumina ($Al_2O_3$) with a particle diameter of 0.3 µm, and alumina ($Al_2O_3$) with a particle diameter of 0.5 µm, according to an exemplary embodiment of the present invention.
Figure 3:
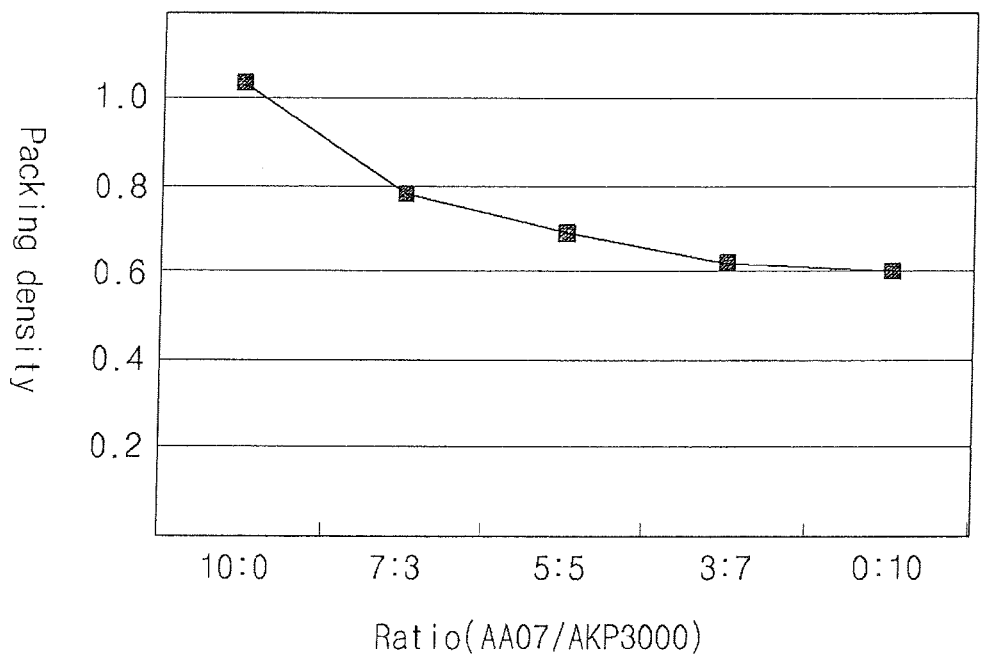
FIG. 3 is a graph illustrating a packing density of a ceramic filler, based on a mixture ratio of alumina ($Al_2O_3$) with a particle diameter of 0.7 µm, and alumina ($Al_2O_3$) with a particle diameter of 0.5 µm as a ceramic filler, according to an exemplary embodiment of the present invention.

FIGS. 1 to 3 are graphs illustrating a packing density based on a ratio when mixing two groups of particles of the same material, but with different diameters, and thereby constructing a ceramic filler. In FIG. 1, alumina ($Al_2O_3$) particles having an average particle diameter of 0.5 μm (AKP3000 alumina, SUMITOMO CHEMICAL CO., Tokyo, Japan) and alumina ($Al_2O_3$) having an average particle diameter of 0.1 μm (AKP50 alumina, SUMITOMO CHEMICAL CO., Tokyo, Japan) were used for the two groups of particles. As shown in FIG. 1, a mixture ratio section D in which the packing density of the AKP50 alumina and the AKP3000 alumina is comparatively higher, includes points A, B, and C. The specific mixture ratio thereof indicates that the AKP 50 alumina and the AKP3000 alumina were mixed together at ratios ranging from 9:1 to 7:3. The point C indicates an optimum mixture ratio E of the AKP50 alumina to the AKP3000 alumina is 7:3.

In FIG. 2, the AKP3000 alumina (with the particle diameter of 0.5 μm) and alumina with a particle diameter of 0.3 μm (AKP30 alumina, SUMITOMO CHEMICAL CO., Tokyo, Japan) were used for the two groups of particles. In FIG. 3, the AKP3000 alumina and alumina with a particle diameter of 0.7 μm (AA07 alumina, SUMITOMO CHEMICAL CO., Tokyo, Japan) were used for the two groups of particles.

The results of the packing densities, based on the diameters illustrated in FIGS. 1 to 3, are shown in Table 1 below.

TABLE 1

|  | Mixture of 0.1 μm alumina & 0.5 μm alumina | Mixture of 0.3 μm alumina & 0.5 μm alumina | Mixture of 0.7 μm alumina & 0.5 μm alumina |
|---|---|---|---|
| Drawings indicating packing density | FIG. 1 | FiG. 2 | FIG. 3 |

TABLE 1-continued

|  | Mixture of 0.1 μm alumina & 0.5 μm alumina | Mixture of 0.3 μm alumina & 0.5 μm alumina | Mixture of 0.7 μm alumina & 0.5 μm alumina |
|---|---|---|---|
| Particle diameter ratio when particle diameter of 0.5 μm alumina is 100 | 20 ((0.1/0.5) × 100) | 60 ((0.3/0.5) × 100) | 140 ((0.7/0.5) × 100) |
| Results | Packing Density increased, and then decreased | Packing Density decreased | Packing Density decreased |

As shown in Table 1 above, when the groups of particles both had relatively smaller diameters, and a difference between the diameters of the two groups of particles to be mixed was greater, the packing density was increased. For example, when the ratio of the AKP50 alumina to the AKP3000 alumina is increased from 10:0 to 7:3, the packing density is increased.

Figure 4:
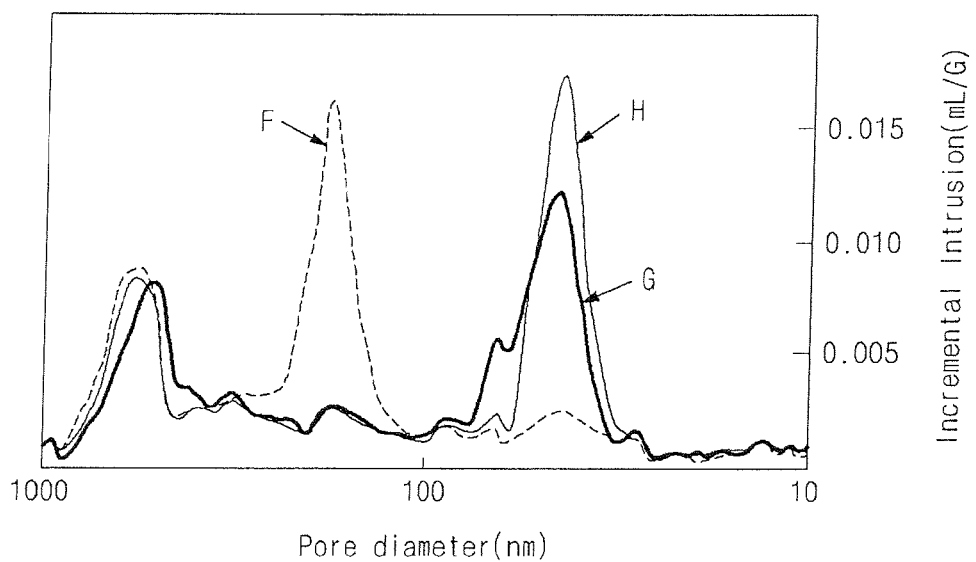
FIG. 4 is a graph illustrating the average pore size of a ceramic separator having particles of different diameters and a ceramic filler composed of particles having the same diameters.

FIG. 4 is a graph illustrating the density after determining the pore size of a ceramic separator, according to the mixture of two groups of particles, of the same material, having different average particle diameters, and another ceramic filler was composed of single-diameter particles. The pore size was measured using an Hg porosimeter. In FIG. 4, when only the AKP3000 alumina (average diameter of 0.5 μm) was used, a pore size F is within the range of 100 nm to 300 nm. In this instance, the maximum pore size was about 181 nm.

When the ceramic separator was fabricated by using only the AKP50 alumina (average diameter of 0.1 μm), a pore size G is within the range of 40 nm to 80 nm. In this instance, two peaks were generated. A lower peak was generated when the pore size was about 65 nm and a higher peak was generated when the pore size was about 46 nm.

When the AKP50 alumina (average diameter of 0.1 μm) and the AKP3000 alumina (average diameter of 0.5 μm) were mixed together at the mixture ratio of 7:3, a pore size H was within the range of 40 nm to 100 nm. In this instance, the maximum pore size was about 46 nm.

A first slurry was prepared by mixing the AKP50 alumina (average diameter of 0.1 μm) and the AKP3000 alumina (average diameter of 0.5 μm) at the mixture ratio of 7:3, with 3% binder and 33% solid powder (ceramic filler and binder). A second slurry was prepared using the AKP3000 alumina (average particle diameter of 0.5 μm) with 3% binder and 33% solid powder. Next, the first and second of the slurries were coated to form first and second ceramic layers, respectively, and the insulating properties thereof were measured. A thickness of the first ceramic layer was less than the thickness of the second ceramic layer. However, the insulating property of the first layer was improved, even at the reduced thickness.

Results of the density of three types of ceramic separators are shown in Table 2 below.

TABLE 2

|  | Ceramic separator | | |
|---|---|---|---|
|  | 0.5 μm alumina | Mixture of 0.1 μm alumina & 0.5 μm alumina at mixture ratio of 7:3 | 0.1 μm alumina |
| Thickness (μm) | 17 μm | 16 μm | 17 μm |

TABLE 2-continued

| | Ceramic separator | | |
|---|---|---|---|
| | 0.5 μm alumina | Mixture of 0.1 μm alumina & 0.5 μm alumina at mixture ratio of 7:3 | 0.1 μm alumina |
| Insulating property | 150 V OK 250 V Not Good 350 V Not Good | 150 V OK 250 V OK 350 V OK | 150 V OK 250 V OK 350 V Not Good |
| Density | 1.52 | 1.81 | 1.69 |

As shown in Table 2 above, the greater density indicates improved insulating properties.

Hereinafter, the secondary battery 100 will be further described, with reference to FIG. 5, having an electrode assembly 200, according to an exemplary embodiment of the present invention, will be described in detail. As described above with reference to FIG. 5, the secondary battery 100 includes the electrode assembly 200, the can 300 to accommodate the electrode assembly 200, and the cap assembly 400 to seal an opening of the can 300.

The electrode assembly 200 includes the anode plate 210, the cathode plate 220, and the separator 230, which is disposed between the anode plate 210 and the cathode plate 220, and then stacked and wound. The separator 230 may include a ceramic layer including a ceramic filler. The ceramic filler is formed by mixing two groups (first and second) of particles of the same material, but having different diameters.

The ceramic filler is formed by mixing the first and second groups of particles at a predetermined mixture ratio. For example, the ceramic filler may include from 70% to 90%, by weight, of the first group of particles, which have a comparatively smaller diameter, and from 10% to 30%, by weight, of the second group of particles, which have a comparatively larger diameter (such that both groups of particles constitute 100% of the ceramic filler).

The can 300 and the cap assembly 400 follow a general configuration. That is, the can 300 is formed of either aluminum or an aluminum alloy, and is rectangular or prismatic. The electrode assembly 200 is accommodated in the can 300, via an opening formed in the top of the can 300. The can 300 functions as a container for the electrode assembly 200 and an electrolyte. The can 300 may function as a terminal.

A cap plate 490 to seal the opening formed in the top of the can 300, is provided in the cap assembly 400. A tube-shaped gasket 305 is mounted between an electrode terminal 430, which is disposed in the middle of the cap plate 490, to insulate the cap plate 490. An insulating plate 420 is disposed on a bottom surface of the cap plate 490. A terminal plate 410 is disposed on a bottom surface of the insulating plate 420. A lower part of the electrode terminal 430 is electrically connected to the terminal plate 412. A positive electrode tap 215, extending from the anode plate 210, is welded to the bottom surface of the electrode terminal 430. A negative electrode tap 225, extending from the cathode plate 220, is welded to the bottom surface of the can 300. The negative electrode tap 225 has a zigzag shape.

An electrolyte injection hole 450 is formed in one side of the cap plate 490, and a stopper 460 is installed to seal the electrolyte injection hole, after injecting the electrolyte. In this instance, the stopper 450 is formed by placing a ball-type perform, formed of aluminum or aluminum containing metal, on the electrolyte injection hole 450, and mechanically supplying pressure into the electrolyte injection hole. In order to seal the electrolyte injection hole 450, the stopper is welded to the cap plate 490 around the electrolyte injection hole. The cap assembly 400 is combined with the can 300, by welding a peripheral portion of the cap plate to a sidewall of the opening.

Hereinafter, an operation of an electrode assembly and a secondary battery with the same according to an embodiment of the present invention will be described. A separator is disposed between two electrodes in order to prevent a short-circuit thereof. The separator includes at least one ceramic separator layer. By a method of forming the ceramic separator layer, a ceramic filler is formed by mixing two groups of particles of the same material having different average particle diameters.

Unlike a conventional method of forming the ceramic filler from particles of a single average particle diameter, the ceramic filler according to aspects of the present invention is formed by mixing of particles of different average particle diameters. Accordingly, the particles having the smaller diameters intersperse into gaps between the particles having the comparatively larger diameters, thereby reducing the pore size of the ceramic filler. Specifically, the pore size is reduced and the film compaction increases, and thus, the insulating property of the ceramic separator may be improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode assembly comprising:
   an anode plate;
   a cathode plate; and
   a separator comprising a ceramic filler, disposed between the anode plate and the cathode plate,
   wherein the ceramic filler is formed by mixing first particles having an average diameter of 0.1 μm and second particles of the same material as the first particles and having an average diameter of 0.5 μm,
   wherein the first particles and the second particles are uniformly distributed throughout the separator from a surface touching the anode plate to an opposite surface touching the cathode plate, and
   wherein a mixture ratio of the first particles to the second particles is 7 to 3 by weight.

2. The electrode assembly as claimed in claim 1, wherein the first and second particles are particles of alumina ($Al_2O_3$).

3. The electrode assembly as claimed in claim 1, wherein the separator has an average pore size of from 40 nm to 100 nm.

4. The electrode assembly as claimed in claim 1, wherein the separator further comprises a binder to bind the first and second particles.

5. The electrode assembly as claimed in claim 1, wherein the separator has an average pore size of from 40 nm to 80 nm.

6. A secondary battery comprising:
   a can;
   a cap assembly to seal an opening of the can; and
   an electrode assembly disposed in the can, comprising:
   an anode plate,
   a cathode plate, and
   a separator comprising a ceramic filler, disposed between the anode plate and the cathode plate,
   wherein the ceramic filler is formed by mixing first particles having an average diameter of 0.1 μm and second particles of the same material as the first particles and having an average diameter of 0.5 μm, wherein the first particles and the second particles are uniformly distributed throughout the separator from a surface touching the anode plate to an opposite surface touching the cathode plate, and wherein a mixture ratio of the first particles to the second particles is 7 to 3 by weight.

7. The secondary battery as claimed in claim 6, wherein the first and second particles are particles of alumina ($Al_2O_3$).

8. The secondary battery as claimed in claim 6, wherein the separator further comprises a binder to bind the first and second particles.

9. The secondary battery as claimed in claim 6, wherein the separator has an average pore size of from 40 nm to 80nm.

10. A electrode assembly of a secondary battery, comprising:
   an anode plate;
   a cathode plate; and
   a separator comprising a ceramic filler, disposed between the anode plate and the cathode plate,
   wherein the ceramic filler is formed by mixing first particles of alumina having an average diameter of 0.1 μm and second particles of alumina having an average diameter of 0.5 μm,
   wherein the first particles and the second particles are uniformly distributed throughout the separator from a surface touching the anode plate to an opposite surface touching the cathode plate, and
   wherein a mixture ratio of the first particles to the second particles is 7 to 3 by weight.

11. The electrode assembly of claim 10, wherein the separator has an average pore size of from 40 nm to 80 nm.

12. The electrode assembly of claim 10, wherein the separator further comprises a binder to bind the first and second particles.

13. An electrode assembly, comprising:
   an anode plate;
   a cathode plate; and
   a separator comprising a ceramic filler, disposed between the anode plate and the cathode plate,
   wherein the ceramic filler is formed by mixing first particles having an average diameter of 0.1 μm and second particles having an average diameter of 0.5 μm, wherein a mixture ratio of the first particles to the second particles is 7 to 3 by weight, and wherein the first and second particles are made of the same material.

14. A secondary battery comprising:
   a can;
   a cap assembly to seal an opening of the can; and
   an electrode assembly disposed in the can, comprising:
      an anode plate,
      a cathode plate, and
      a separator comprising a ceramic filler and disposed between the anode plate and the cathode plate,
   wherein the ceramic filler is formed by mixing first particles and second particles of the same material, wherein the first particles have an average diameter of 0.1 μm, wherein the second particles have an average diameter of 0.5 μm, and wherein a mixture ratio of the first particles to the second particles is 7 to 3 by weight.

* * * * *